US008463066B2

(12) United States Patent  
Komiya

(10) Patent No.: US 8,463,066 B2  
(45) Date of Patent: Jun. 11, 2013

(54) DISPLAY DEVICE AND METHOD OF DRIVING THE SAME

(75) Inventor: Naoaki Komiya, Yongin (KR)

(73) Assignee: Samsung Display Co., Ltd., Giheung-Gu, Yongin, Gyeonggi-Do (KR)

( * ) Notice: Subject to any disclaimer, the term of this patent is extended or adjusted under 35 U.S.C. 154(b) by 1028 days.

(21) Appl. No.: 12/457,694

(22) Filed: Jun. 18, 2009

(65) Prior Publication Data

US 2009/0315919 A1 Dec. 24, 2009

(30) Foreign Application Priority Data

Jun. 18, 2008 (KR) .......................... 10-2008-0057390

(51) Int. Cl.
*G06K 9/40* (2006.01)

(52) U.S. Cl.
USPC ........... 382/266; 382/167; 382/274; 382/275; 358/3.26; 358/3.27; 358/463

(58) Field of Classification Search
USPC . 382/164, 167, 260, 266, 274, 275; 358/3.26, 358/3.27, 463
See application file for complete search history.

(56) References Cited

U.S. PATENT DOCUMENTS

| | | | | |
|---|---|---|---|---|
| 7,042,527 B2* | 5/2006 | Imai | ............................... | 348/742 |
| 7,180,514 B2* | 2/2007 | Kuno et al. | ................... | 345/211 |
| 7,545,397 B2* | 6/2009 | O'Dea et al. | ................... | 345/694 |
| 7,549,756 B2* | 6/2009 | Willis et al. | ...................... | 353/84 |
| 7,961,227 B2* | 6/2011 | Arakawa | .................... | 348/223.1 |
| 2002/0196264 A1 | 12/2002 | Goetz | | |
| 2008/0131017 A1 | 6/2008 | Borel et al. | | |

FOREIGN PATENT DOCUMENTS

| | | |
|---|---|---|
| JP | 2003-195808 | 7/2003 |
| JP | 2003-216100 | 7/2003 |
| JP | 2004-012897 | 1/2004 |
| KR | 1020010005598 A | 1/2001 |
| KR | 10-2004-0070043 | 8/2004 |
| KR | 10-2004-0078437 | 9/2004 |
| KR | 1020050058959 A | 6/2005 |
| KR | 1020070024333 A | 3/2007 |
| WO | 2007/119731 A1 | 10/2007 |

OTHER PUBLICATIONS

Korean Office Action issued on Oct. 28, 2009, corresponding to the Korean Patent Application No. 10-2008-0057390.
Korean Notice of Decision to Grant a Patent dated Jan. 25, 2010, corresponding to Korean Priority Application No. 10-2008-0057390.

* cited by examiner

*Primary Examiner* — Yosef Kassa
(74) *Attorney, Agent, or Firm* — Robert E. Bushnell, Esq.

(57) ABSTRACT

A display device and a method for driving the display device are provided. A pre-gain correction value that can emphasize a contour portion of an image is set by using luminance data detected from an input video signal. The pre-gain correction value is differently amplified in accordance with different light emitting materials that emit light of different colors red, green and blue. The contour portion is thus emphasized, and the contour can be stably emphasized regardless of different life-spans of different light emitting materials emitting lights of colors red, green and blue.

20 Claims, 5 Drawing Sheets

DISPLAY DEVICE AND METHOD OF DRIVING THE SAME

CLAIM OF PRIORITY

This application makes reference to, incorporates the same herein, and claims all benefits accruing under 35 U.S.C. §119 from an application for a DISPLAY DEVICE AND THE DRIVING METHOD THEREOF earlier filed in the Korean Intellectual Property Office on 18 Jun. 2008 and there duly assigned Serial No. 10-2008-0057390.

BACKGROUND OF THE INVENTION

1. Field of the Invention

The present invention relates to a display device and a method of driving the display device, and more particularly, to a display device eliminating life-span deviation due to differences between light emitting materials and to a method for driving the display device.

2. Description of the Related Art

A display device forms variable visual display images of moving or still objects based upon its reception of a video signal. The demands of consumers and original equipment manufacturers necessitate a substantial reduction in both the weight and thickness of the display device. Display devices must be reduced in both of weight and thickness in order to be compatible with the renewed slimness of such sources of the video signal as a personal computer or a television, etc. In response to these demands, a display device employing an organic light emitting diode (OLED) has been developed. An OLED is a light emitting diode (LED) whose emissive electroluminescent layer is composed of a film of organic compounds. Therefore, the display device including an OLED uses different technology compared to cathode ray tubes (CRTs), flat panel type display devices such as liquid crystal display (LCD) devices and plasma display panels (PDPs).

In an OLED display device, target data displays a target image having a contour such as an image of a person, and background data displays a background image within which the target image is positioned. When the difference in luminance between the target data and background data is not significant, the outline of the target image may become indistinct from the background image, and thus images on a screen become unclear and less than readily discernable to an audience of human beings.

Therefore, a method for emphasizing the contour of the target image was developed in order to clearly display a border between the target image and the background image. In order to emphasize the contour of the target image, a higher voltage or current should be applied to the display elements corresponding to the contour formed by those pixels defining a transition between the background and the target images, in comparison to the voltage or current applied on other display elements.

In this scenario, it is very important to observe that the life span of an OLED driven by an electrical current, is determined by the magnitude of the electrical current. Particularly, when the magnitude of the electrical current flowing through an OLED increases, the life-span of the OLED decreases. An OLED generally includes several different light emitting materials that emit light of different colors, and the life-spans of light emitting material are different according to the different display color. Therefore, in order to emphasize the contour of the target image, when the electrical current with a large magnitude flows through the OLED, a life span deviation due to different light emitting materials emitting light of different colors may be disadvantageously increased and thus a life-span of a pixel that displays a specific color positioned among pixels that display a plurality of colors may be shortened, thus deleteriously reducing the overall quality. Therefore, the life-span of the OLED display device may be shortened.

The above information disclosed in this Background discussion is only for enhancement of understanding of the background of the present invention and therefore it may contain information that does not constitute prior art that is already known in this country to a person of ordinary skill in the art.

SUMMARY OF THE INVENTION

It is therefore an object of the present invention to provide an improved display device, and an improved method for driving a display device.

It is another object to provide a display device that is able to eliminate life-span deviation due of differences between the light emitting materials, and a method for driving a display device in order to reduce life-span deviation attributable to differences between the light emitting materials.

It is still anther object to prevent the shortened life-span of the OLED display device due to high driven electrical current of pixels.

It is yet another object to provide a display device and a method of driving the display device in order to advantageously compensate for life-span deviation of OLEDs characteristic of different light emitting material of pixels.

An exemplary embodiment of the present invention provides a display device that may be constructed with a luminance data detector that detects luminance data contained in an input video signal including a first color video signal and a second color video signal; a contour detector that detects a contour portion of an image that is displayed by the input video signal by detecting an amount of change of the luminance data; a pre-gain controller that sets a pre-gain correction value that determines an amount of emphasis to assign to the luminance data of the contour portion; and a first gain controller and a second gain controller that respectively output a first gain correction value and a second gain correction value that respectively correspond to the first color video signal and the second color video signal, by amplifying the pre-gain correction value.

Another embodiment of the present invention provides a method for driving a display device that displays an input video signal including a first color video signal and a second color video signal. The method of driving a display device includes detecting luminance data from the input video signal including the first color video signal and the second color video signal; detecting a contour portion of an image that is displayed by the input video signal by detecting an amount of change in the luminance data; setting a pre-gain correction value that determines an amount of emphasis of the luminance data of the contour portion; and setting a first gain correction value and a second gain correction value respectively corresponding to the first color video signal and the second color video signal, by amplifying the pre-gain correction value.

According to an exemplary embodiment of the present invention, a contour of a target image may be safely emphasized, regardless of the differences between the life-spans of light emitting materials, incorporated into the structure of the OLED display device.

BRIEF DESCRIPTION OF THE DRAWINGS

A more complete appreciation of the invention and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
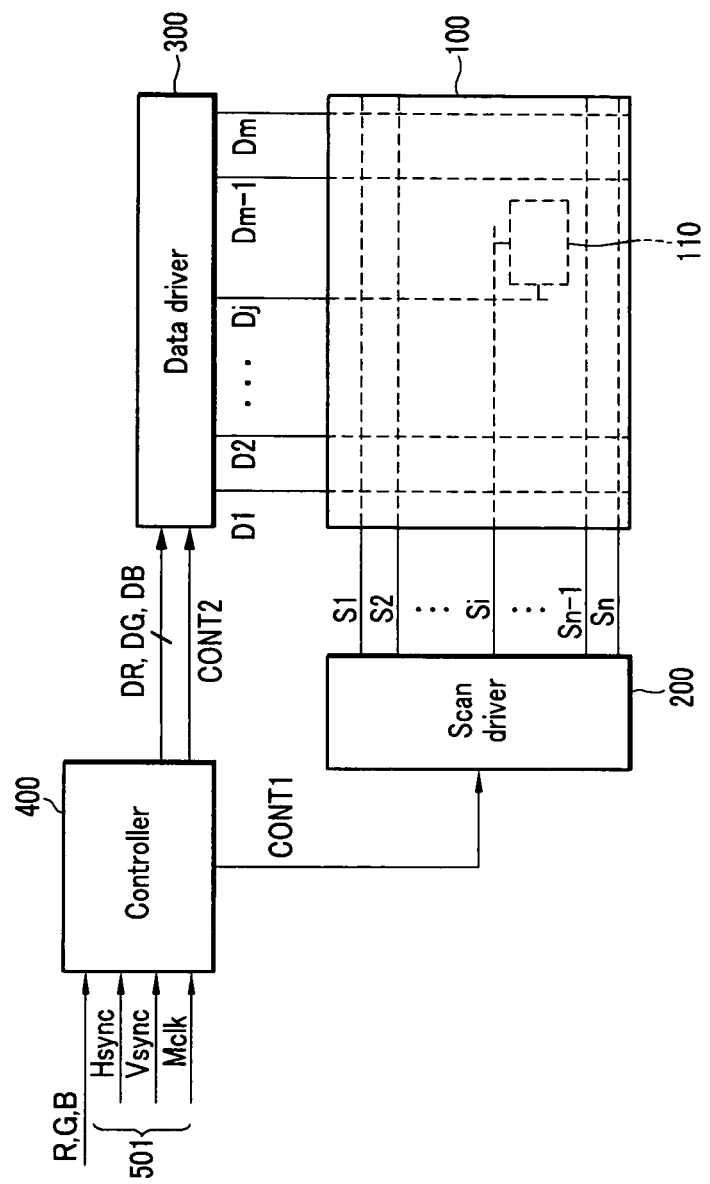
FIG. 1 is a block diagram of a display device constructed as an exemplary embodiment of the present invention.

In the following detailed description, only certain exemplary embodiments of the present invention will be shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In an entire specification, unless explicitly described to the contrary, the word "comprise" and variations such as "comprises" or "comprising", will be understood to imply the inclusion of stated elements but not the exclusion of any other elements.

A display device and a method of driving the same according to an exemplary embodiment of the present invention will be described in detail hereinafter with reference to the drawings.

Figure 2:
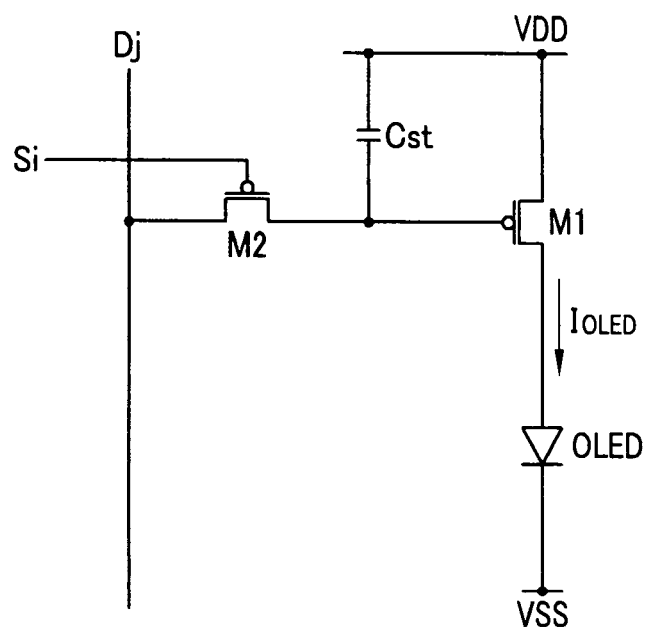
FIG. 2 is an equivalent circuit diagram of a pixel of the display device as shown in FIG. 1.

FIG. 1 is a block diagram of a display device constructed as an exemplary embodiment of the present invention, and FIG. 2 is an equivalent circuit diagram of a pixel of the display device as shown in FIG. 1.

Turning now to FIG. 1, the display device includes display unit 100, scan driver 200, data driver 300, and controller 400.

Display unit 100 includes a plurality of signal lines S1-Sn and D1-Dm, a plurality of voltage lines (not shown), and a plurality of pixels 110 that are electrically connected to the signal lines and the voltage lines. The plurality of pixels 110 are arranged approximately in a matrix form, from an equivalent circuital view.

The signal lines S1-Sn and D1-Dm include a plurality of scanning lines S1-Sn and a plurality of data lines D1-Dm. Scanning lines S1-Sn transfer scanning signal from scan driver 200 to pixels 110, and data lines D1-Dm transfer data signal from data driver 300 to pixels 110. The plurality of scanning lines S1-Sn extend approximately in a row direction and are disposed approximately parallel to each other, and the plurality of data lines D1-Dm extend approximately in a column direction and are disposed approximately parallel to each other. In this case, the data signal may be a voltage signal (hereinafter, referred to as a "data voltage") or a current signal (hereinafter, referred to as a "data current") according to the type of pixel 110, and hereinafter, the data signal is described as a data voltage.

Referring to FIG. 2, in display unit 100, for example, a pixel 110 is connected to an i-th (i=1, 2, ..., n) scan line S1 and a j-th (j=1, 2, ..., m) data line Dj includes an organic light emitting element, a driving transistor M1, a capacitor Cst, and a switching transistor M2.

Switching transistor M2 has a control terminal, an input terminal, and an output terminal. The control terminal is electrically connected to the scanning line Si, the input terminal is electrically connected to the data line Dj, and the output terminal is electrically connected to the driving transistor M1. The switching transistor M2 transfers a data signal, i.e. a data voltage that is applied to the data line Dj in response to a scanning signal that is applied to the scanning line Si.

The driving transistor M1 also has a control terminal, an input terminal, and an output terminal. The control terminal is electrically connected to the switching transistor M2, the input terminal is electrically connected to a driving voltage VDD, and the output terminal is electrically connected to the OLED. Current $I_{OLED}$ flows through the driving transistor M1 and $I_{OLED}$ has a magnitude changing in accordance with a voltage that is applied between the control terminal and the output terminal of the driving transistor M1.

The capacitor Cst is connected between the control terminal and the input terminal of the driving transistor M1. The capacitor Cst charges a data voltage that is applied to the control terminal of the driving transistor M1 and sustains the data voltage even after the switching transistor M2 is turned off.

The organic light emitting element may be an organic light emitting diode (OLED). The OLED has an anode electrically connected to an output terminal of the driving transistor M1 and a cathode electrically connected to a common voltage VSS. The OLED displays an image by emitting light with different intensity according to an output current $I_{OLED}$ of the driving transistor M1.

The OLED may emit light of one of primary colors. The primary colors include, for example, three primary colors of red R, green G, and blue B, and a desired color is displayed with a spatial combination or a temporal combination of the three primary colors. In this case, a part of the OLED can emit white light and thus luminance rises. Alternatively, the OLED of all pixels 110 can emit white light, and some pixel 110 may further include a color filter (not shown) that filtering one of basic color light from the white light emitted from the OLED.

The switching transistor M2 and the driving transistor M1 may be a p-channel field effect transistor (FET). In this case, the control terminal, the input terminal, and the output terminal correspond to a gate, a source, and a drain, respectively. At least one of the switching transistor M2 and the driving transistor M1, however, may be an n-channel FET. Therefore, the connections between the transistors M1 and M2, the capacitor Cst, and the OLED may be changed accordingly.

Pixel 110 as shown in FIG. 2 is an example of a pixel of the display device, and another form of pixel including at least two transistors or at least one capacitor may be used. Further, as described above, a pixel that receives a data current as a data signal may be used.

Turning now again to FIG. 1, scan driver 200 is electrically connected to the scan lines S1-Sn of display unit 100 and sequentially applies scan signals to the scan lines S1-Sn. The scan signal includes a combination of a gate-on voltage Von that can turn on the switching transistor M2 and a gate-off voltage Voff that can turn off the switching transistor M2. When the switching transistor M2 is a p-channel FET, the gate-on voltage Von and the gate-off voltage Voff are a low voltage and a high voltage, respectively.

Data driver 300 is electrically connected to the data lines D1-Dm of display unit 100, converts input image data DR, DG, and DB that are input from controller 400 to a data voltage, and applies the data voltage to the data lines D1-Dm.

Controller 400 controls scan driver 200 and data driver 300, and receives input video signals R, G, and B and an input control signal 501 that controls the display device from an exterior. The input video signals R, G, and B contain luminance information of each pixel 110, and the luminance information has grays of the determined quantity, for example, 1024($=2^{10}$), 256($=2^{8}$), or 64($=2^{6}$). The input control signal 501 includes, for example, a horizontal synchronization signal Hsync, a vertical synchronization signal Vsync, and a main clock signal Mclk.

Controller 400 receives input video signals R, G, and B and input control signals Hsync, Vsync, and Mclk, converts the input video signals R, G, and B into input image data DR, DG, and DB, and processes the input control signals Hsync, Vsync, and Mclk, thereby generating a scanning control signal CONT1 and a data control signal CONT2.

Input control signal 501 includes a vertical synchronization signal Vsync, a horizontal synchronization signal Hsync, a main clock signal Mclk, and a data enable signal DE (not shown). The vertical synchronization signal Vsync is a signal that notifies a period of a frame of the input video signals, and the horizontal synchronization signal Hsync is a signal that notifies a period of a line of the input video signals. The main clock signal Mclk is a clock signal necessary for a normal operation of controller 400, such as converting the input video signals into input image data and generating an input control signal. The data enable signal DE is a signal that displays a region where data for displaying an image are positioned among the input video signals.

The gate control signal CONT1 includes a scanning start signal that instructs the start of scanning and at least one clock signal that controls an output period of a gate-on voltage Von that turns on a switch M2 of a pixel circuit. The gate control signal CONT1 may further include an output enable signal that limits a sustain time period of a gate-on voltage Von.

The data control signal CONT2 includes a horizontal synchronization start signal that notifies the start of transmission of image data signals DR, DG, and DB for one row (set) of pixels 110, and a load signal and a data clock signal that apply an analog data voltage to the data lines D1-Dm.

Controller 400 transfers the scanning control signal CONT1 to scan driver 200 and transfers the data control signal CONT2 and the processed input image data DR, DG, and DB to data driver 300.

Controller 400 detects luminance data Y from input video signals R, G, and B, detects a contour portion based on the luminance data Y, and compensates luminance data of the contour portion, thereby performing an emphasizing process of the contour. Controller 400 converts the luminance data Y according to a predetermined gain in order to emphasize the contour. That is, controller 400 differently sets a gain for compensating luminance data Y corresponding to the contour according to red R, green G, and blue B colors. A detailed description thereof will be described as follows.

An operation of the display device is described in detail hereinafter.

According to the data control signal CONT2 transmitted from controller 400, data driver 300 receives image data DR, DG, and DB for one row of pixels 110, converts the input image data DR, DG, and DB to a data voltage, and applies the data voltage to the corresponding data lines D1-Dm.

Scan driver 200 applies a gate-on voltage Von to scan lines S1-Sn according to the scanning control signal CONT1 from controller 400, thereby turning on a switching transistor M2 that is connected to the scan lines S1-Sn. Accordingly, a data voltage that is applied to the data lines D1-Dm is transferred to corresponding pixel 110 through the turned-on switching transistor M2.

Turning now to FIG. 2, the driving transistor M1 receives a data voltage through the turned-on switching transistor M2, and the OLED emits light of intensity corresponding to current $I_{OLED}$ of the driving transistor M1.

By repeating such a process in units of one horizontal period (may be identical to one period of a horizontal synchronization signal Hsync), a gate-on voltage Von is sequentially applied to all scan lines S1-Sn, and a data voltage is applied to all pixels 110, so that an image of one field or one frame is displayed by pixels 110.

The method of compensation of luminance data on a color basis is described in detail hereinafter with reference to FIGS. 3 and 4.

Figure 3:
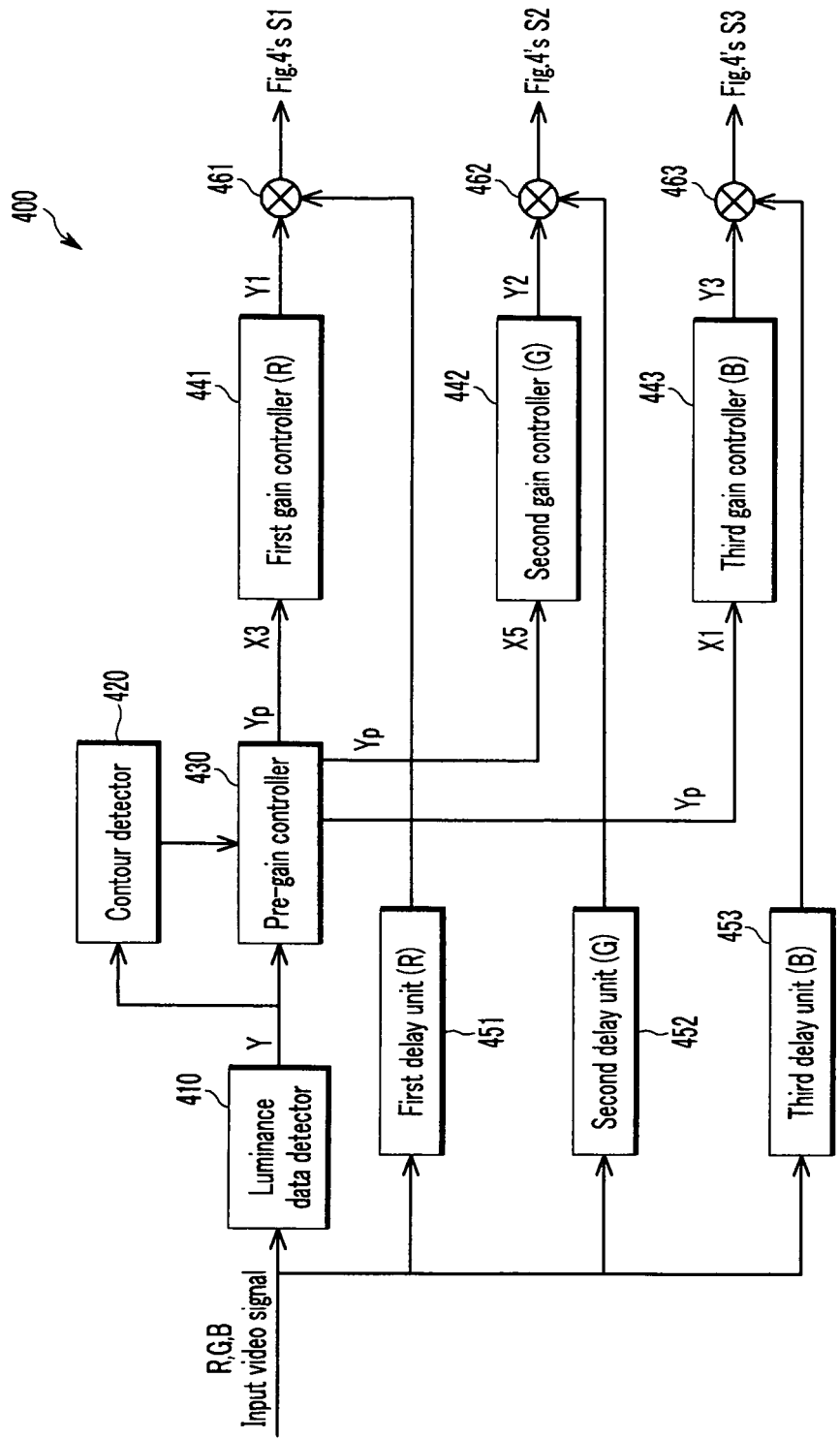
FIG. 3 is a block diagram of a controller of the display device constructed as an exemplary embodiment of the present invention.
Figure 4:
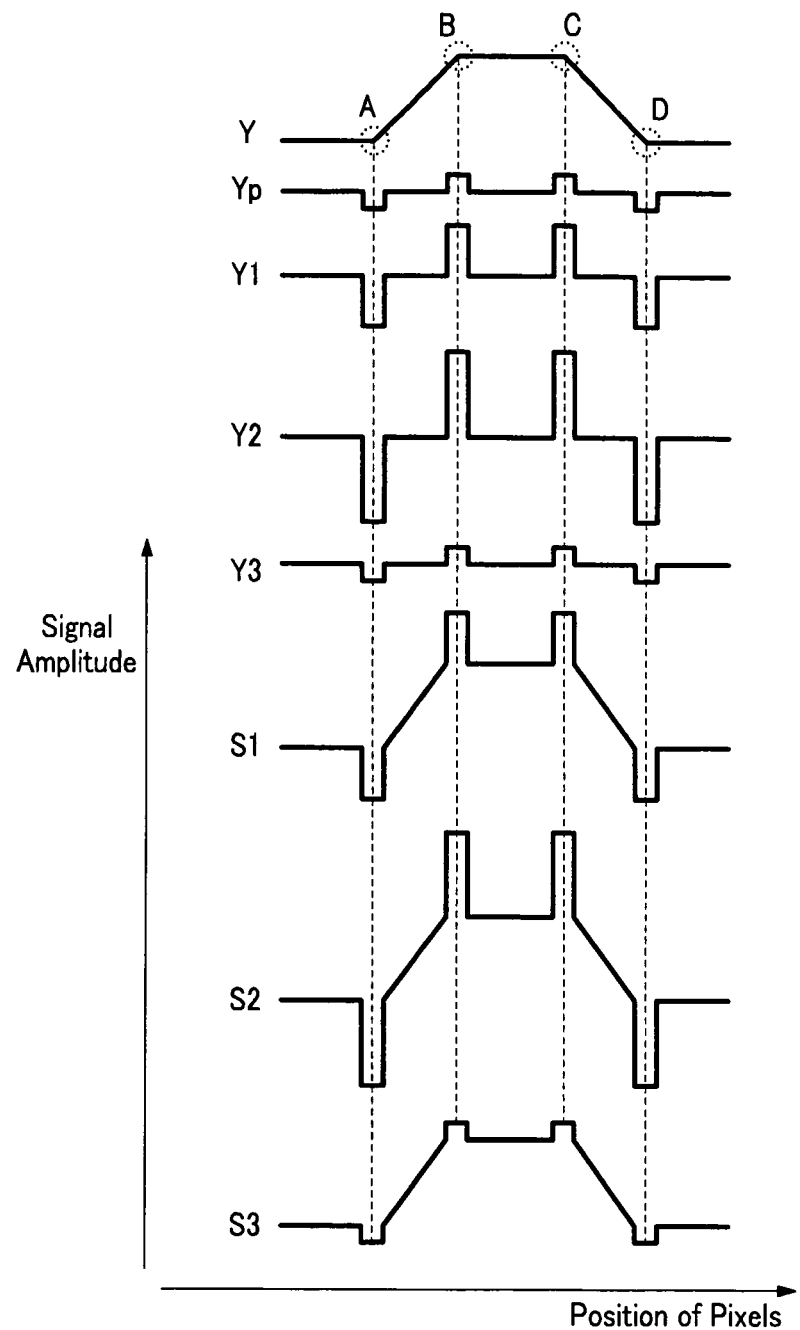
FIG. 4 is a group of waveforms illustrating the operational procedures of the controller that may be used to regulate the performance of a display device constructed as an exemplary embodiment of the present invention.

FIG. 3 is a block diagram of controller 400 of the display device constructed as an exemplary embodiment of the present invention, and FIG. 4 is a group of waveforms illustrating the operation procedure of controller 400 constructed as an exemplary embodiment of the present invention.

As shown in FIG. 3, controller 400 includes a luminance data detector 410, a contour detector 420, a pre-gain controller 430, first to third gain controllers 441, 442, and 443, first to third delay units 451, 452, and 453, and first to third addition units 461, 462, and 463.

Luminance data detector 410 detects luminance data Y from input video signals R, G, and B.

Contour detector 420 detects a contour portion by detecting a slope relative to a pixel position of the luminance data Y. That is, contour detector 420 detects a slope representing a ratio of an amount of change of the luminance data to an amount of change of positions of the plurality of pixels, and determines a position at which a slope abruptly changes as the contour of the image that is displayed by an input video signal. In other words, contour detector 420 detects a position of a pixel corresponding to the determined contour. As shown in FIG. 4, contour detector 420 detects edge points A, B, C, and D in which a slope of luminance data Y abruptly changes as a contour portion. The edge point A is a contour portion in which a slope of luminance data increases from 0 to a predetermined positive value, the edge point B is a contour portion in which a slope of luminance data decreases from a predetermined positive value to 0, the edge point C is a contour portion in which a slope of luminance data decreases from 0 to a predetermined negative value, and the edge point D is a contour portion in which a slope of luminance data increases from a predetermined negative value to 0.

Pre-gain controller 430 sets a pre-gain correction value Yp that determines a degree of emphasizing luminance data of the contour portion based on luminance data Y. Pre-gain controller 430 sets a subtraction gain that further lowers luminance as a pre-gain correction value in order to emphasize low luminance of the contour portion when luminance of the contour portion is less than reference luminance, and sets an addition gain that further raises luminance as a pre-gain correction value in order to emphasize high luminance of the contour portion when luminance of the contour portion is equal to or higher than the reference luminance. Pre-gain controller 430 sets a subtraction gain as a pre-gain correction value in order to emphasize low luminance in a low luminance contour portion such as edge points A and D, and sets an addition gain as a pre-gain correction value in order to emphasize high luminance in a high luminance contour portion such as edge points B and C. As shown in FIG. 4, pre-gain controller 430 outputs a pre-gain correction value Yp to each of the first to third gain controllers 441, 442, and 443.

In general, light emitting materials of a plurality of colors R, G, and B have life-spans of an order of blue B>red R>green G. Therefore, when equally applying a pre-gain correction value Yp to the light emitting materials of a plurality of colors R, G, and B, because life-spans of different light emitting material are different on a color basis, a deviation in emphasizing a contour on a color basis occurs. The contour may be unclearly emphasized due to such a deviation. The first gain controller 441 sets the pre-gain correction value for light emitting material of color R, the second gain controller 442 sets the pre-gain correction value for light emitting material of color G, and the first gain controller 441 sets the pre-gain correction value for light emitting material of color B.

Therefore, in an exemplary embodiment of the present invention, by amplifying a plurality of colors R, G, and B with different pre-gain correction values by using the first to third controllers 441, 442, and 443, each of gain correction values is differently set.

Hereinafter, in consideration of a life-span of light emitting material, it is assumed that the pre-gain correction value is respectively amplified to three times, five times, and one time in the first to third controllers 441, 442, and 443. The amplification ratio is however not fixed to three times, five times, and one time according to a plurality of colors R, G, and B, but is not limited to the above mentioned values.

In this exemplary embodiment, the first gain controller 441 amplifies a pre-gain correction value Yp by three times in consideration of a life-span of a light emitting material R and outputs the first gain correction value to the first addition unit 461.

The second gain controller 442 amplifies a pre-gain correction value Yp by five times in consideration of a life-span of a light emitting material G and outputs the second gain correction value to the second addition unit 462.

The third gain controller 443 amplifies a pre-gain correction value Yp by one time in consideration of a life-span of a light emitting material B and outputs the third gain correction value to the third addition unit 463.

The first delay unit 451 delays a red R video signal among the input video signals by a predetermined time period t and outputs the red R video signal to the first addition unit 461.

The second delay unit 452 delays a green G video signal among the input video signals by a predetermined time period t and outputs the green G video signal to the second addition unit 462.

The third delay unit 453 delays a blue B video signal among the input video signals by a predetermined time period t and outputs the blue B video signal to the third addition unit 463.

In this case, the predetermined time period t is determined according to a time interval between a time point in which luminance data Y are divided and are input to pre-gain controller 430 and a time point in which pre-gain correction value Y1 that is amplified at the first gain controller 441 is input to the first addition unit 461.

As shown in FIG. 4, the first addition unit 461 adds the first gain correction value Y1 to the red R video signal and outputs a new red R video signal S1 in which the contour is emphasized. The second addition unit 462 adds the second gain correction value Y2 to the green G video signal and outputs a new green G video signal S2 in which a contour is emphasized. The third addition unit 463 adds the third gain correction value Y3 to a blue B video signal and outputs a new blue B video signal S3 in which a contour is emphasized.

Figure 5:
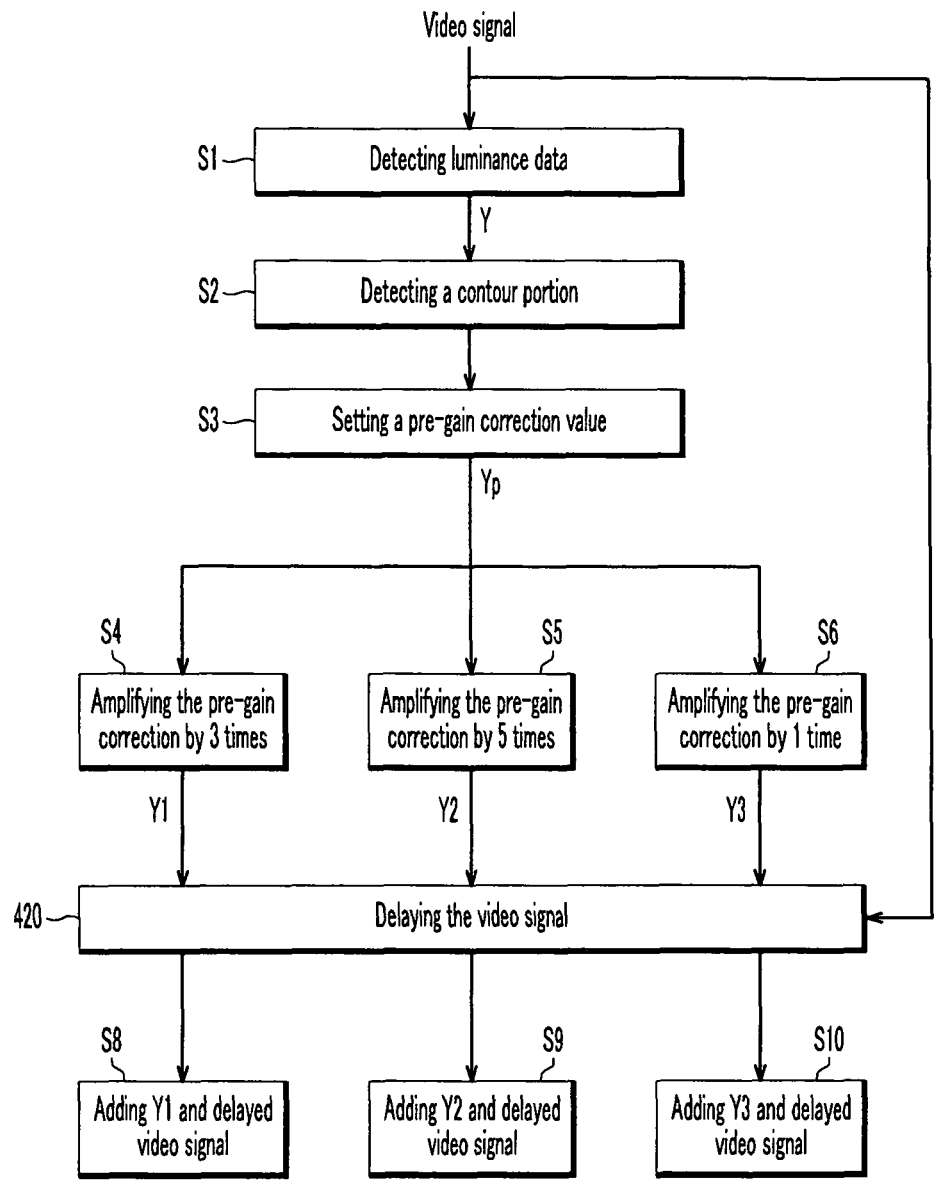
FIG. 5 is a flow chart illustrating the operational procedures of the controller that may be used to regulate the performance of a display device constructed as an exemplary embodiment of the present invention.

FIG. 5 is a flow chart illustrating the operational procedures of the controller that may be used to regulate the performance of a display device constructed as an exemplary embodiment of the present invention.

In step S1, luminance data detector 410 detects the luminance data Y from the input video signals. In step S2, contour detector 420 detects a contour portion of an image that is displayed by the display device in response to reception of the input video signal by detecting an amount of change of the luminance data. In step S3, pre-gain controller 430 sets a pre-gain correction value Yp that determines an amount of emphasis of the luminance data for the contour portion. In steps S4, S5 and S6, first gain controller 441, second gain controller 442 and third gain controller 443 respectively amplify the pre-gain value Yp corresponding to video signals R, G and B. Therefore, three gain correction values Y1, Y2 and Y3 are generated. In step S7, delay units 451, 452 and 453 respectively delay video signal R, G and B. In steps S8, S9 and S10, addition units 461, 462 and 463 respectively add Y1 to delayed video signal R to obtain red R video signal S1, add Y2 to delayed video signal G to obtain green G video signal S2, and add Y3 to delayed video signal B to obtain blue B video signal S3.

In this way, in an exemplary embodiment of the present invention, a pre-gain correction value that can emphasize a contour portion is set using luminance data that are detected from the input video signal, and by differently amplifying a pre-gain correction value according to a plurality of light emitting material emitting light of colors R, G, and B, a counter portion is emphasized, and thus a contour can be stably emphasized regardless of life-spans of light emitting material of a plurality of colors R, G, and B.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A display device, comprising:
    a luminance data detector that detects luminance data contained in an input video signal that includes a first color video signal and a second color video signal;
    a contour detector that detects a contour portion of an image that is displayed by the input video signal by detecting an amount of change of the luminance data;
    a pre-gain controller that sets a pre-gain correction value that determines an amount of emphasis of the luminance data for the contour portion;
    a first gain controller that generates a first gain correction value by amplifying the pre-gain correction value corresponding to the first color video signal; and
    a second gain controller that generates a second gain correction value by amplifying the pre-gain correction value corresponding to the second color video signal.

2. The display device of claim 1, wherein when a life-span of light emitting material that displays a first color and a life-span of light emitting material that displays a second color are different, the first gain correction value and the second gain correction value are different.

3. The display device of claim 1, wherein when a life-span of light emitting material that displays a first color is longer than that of light emitting material that displays a second color, the first gain correction value is smaller than the second gain correction value.

4. The display device of claim 1, wherein the amount of change of the luminance data is a change of a slope of the luminance data to an amount of change of positions of a plurality of pixels of the display device.

5. The display device of claim 4, wherein the contour detector detects, as a counter portion, an area including a first edge point in which the change in slope increases from zero to a predetermined positive value, a second edge point in which the change in slope decreases from the predetermined positive value to zero, a third edge point in which the change in slope decreases from zero to a predetermined negative value, and a fourth edge point in which the change slope increases from the predetermined negative value to zero.

6. The display device of claim 5, wherein the pre-gain controller sets a subtraction gain that decreases luminance as the pre-gain correction value in the contour portion corresponding to the first edge point and the fourth edge point, and sets an addition gain that increases luminance as the pre-gain correction value in the contour portion corresponding to the second edge point and the third edge point.

7. The display device of claim 1, further comprising:
a first delay unit that delays the first color video signal;
a second delay unit that delays the second color video signal;
a first addition unit that adds the delayed first color video signal to the first gain correction value; and
a second addition unit that adds the delayed second color video signal to the second gain correction value.

8. The display device of claim 1, wherein the input video signal further comprises a third color video signal, and the display device further comprises:
a third delay unit that delays the third color video signal;
a third gain controller that outputs a third gain correction value corresponding to the third color video signal by amplifying the pre-gain correction value; and
a third addition unit that adds the delayed third color video signal to the third gain correction value.

9. A method of driving a display device that displays an input video signal including a first color video signal and a second color video signal, comprising:
detecting luminance data from the input video signal including the first color video signal and the second color video signal;
detecting a contour portion of an image that is displayed by the display device in response to reception of the input video signal by detecting an amount of change of the luminance data;
setting a pre-gain correction value that determines an amount of emphasis of the luminance data for the contour portion; and
amplifying the pre-gain correction value respectively corresponding to the first color video signal and the second color video signal, setting a first gain correction value in accordance with the amplified pre-gain correction value corresponding to the first color video signal, and setting a second gain correction value in accordance with the amplified pre-gain correction value corresponding to the second color video signal.

10. The method of claim 9, further comprising:
delaying the first color video signal and the second color video signal by a predetermined time period; and
adding the delayed first color video signal and second color video signal to the first gain correction value and the second gain correction value, respectively.

11. The method of claim 10, wherein the predetermined time period is determined according to a time period from the detection of the luminance data to the addition of the luminance data.

12. The method of claim 9, wherein when a life-span of light emitting material that displays a first color and a life-span of light emitting material that displays a second color are different, the first gain correction value and the second gain correction value are differently amplified.

13. The method of claim 9, when a life-span of light emitting material that displays a first color is longer than that of light emitting material that displays a second color, the first gain correction value being smaller than the second gain correction value.

14. The method of claim 9, wherein the amount of change of the luminance data is a change of a slope of the luminance data to an amount of change of positions of a plurality of pixels of the display device.

15. The method of claim 9, wherein the step of detecting of the contour portion comprises the steps of:
detecting a first edge point in which the change in the slope increases from zero to a predetermined positive value as the contour portion;
detecting a second edge point in which the change in the slope decreases from the predetermined positive value to zero as the contour portion;
detecting a third edge point in which the change in the slope decreases from zero to a predetermined negative value as the contour portion; and
detecting a fourth edge point in which the change in the slope increases from the predetermined negative value to zero as the contour portion.

16. The method of claim 15, wherein the step of setting of the pre-gain correction value comprises the steps of:
setting a subtraction gain that decreases luminance as the pre-gain correction value in the contour portion corresponding to the first edge point and the fourth edge point; and
setting an addition gain that increases luminance as the pre-gain correction value in the contour portion corresponding to the second edge point and the third edge point.

17. A display device, comprising:
a plurality of pixels emitting light of different colors;
a first unit detecting luminance data carried by a plurality of video signals providing luminance information for controlling emission of the light by the plurality of pixels;
a second unit determining a contour of a displayed image;
a third unit setting a primary value of emphasis for the luminance data corresponding to the determined contour; and
a fourth unit generating amplified pre-gain correction values by amplifying the primary value of the luminance data in accordance with one of the plurality of video signals.

18. The display device of claim 17, with the second unit determining the contour of the displayed image by detecting a ratio of an amount of change in the luminance data at corresponding positions of the plurality of pixels.

19. The display device of claim 18, with the amount of change in the luminance data comprising a change in a slope of the luminance data at corresponding positions of a plurality of pixels of the display device.

20. The display device of claim 18, further comprising:
a fifth unit that delays one of the plurality of the video signals; and a sixth unit that adds the delayed one of the plurality of the video signals to a corresponding amplified pre-gain correction value.

* * * * *